(12) United States Patent
Jeong

(10) Patent No.: US 6,871,102 B2
(45) Date of Patent: Mar. 22, 2005

(54) APPARATUS AND METHOD FOR VERIFYING MEMORY COHERENCY OF DUPLICATION PROCESSOR

(75) Inventor: Sang Ic Jeong, Ansan (KR)

(73) Assignee: LG Electronics Inc., Seoul (KR)

(*) Notice: Subject to any disclaimer, the term of this patent is extended or adjusted under 35 U.S.C. 154(b) by 890 days.

(21) Appl. No.: 09/730,747

(22) Filed: Dec. 7, 2000

(65) Prior Publication Data

US 2002/0073288 A1 Jun. 13, 2002

(51) Int. Cl.[7] .............................................. G06F 12/16
(52) U.S. Cl. ........................ 700/2; 711/154; 711/161; 711/162; 711/141; 711/118; 700/3; 709/208; 712/34; 714/6; 714/13
(58) Field of Search ................................. 711/163, 167, 711/141, 154, 118, 161, 162; 714/11, 12, 13, 6; 700/1, 2, 3; 712/34; 709/208

(56) References Cited

U.S. PATENT DOCUMENTS

| | | | |
|---|---|---|---|
| 6,327,670 B1 * | 12/2001 | Hellenthal et al. .............. 714/5 |
| 6,363,464 B1 * | 3/2002 | Mangione .................... 711/167 |
| 6,427,213 B1 * | 7/2002 | Dao ............................ 714/12 |
| 6,487,169 B1 * | 11/2002 | Tada ........................... 370/219 |
| 6,553,476 B1 * | 4/2003 | Ayaki et al. ................. 711/204 |

* cited by examiner

Primary Examiner—Mano Padmanabhan
Assistant Examiner—Jasmine Song
(74) Attorney, Agent, or Firm—Fleshner & Kim, LLP

(57) ABSTRACT

An apparatus for verifying memory coherency of a duplication processor having a symmetrical structure includes: an active processor in which a standby memory read command (SMRC) is generated and transmitted by hardware and then a read data of the standby memory which has been inputted corresponding to the SMRC is image-buffered to verify a memory coherency; and a standby processor in which the SMRC transmitted from the active processor is analyzed and a read command of a standby memory is outputted, and then the data read from the standby memory is transmitted to the active processor. A burst transaction can be performed both when the data is read from the standby memory and when the read data is transmitted, so that the use efficiency of the processor bus, the duplication bus and the duplication channel can be improved. Especially, a bad influence according to the operation of each processor and the duplication channel can be minimized. Moreover, the SMIB provides burst mechanism function, so that the CPU of the active processor can perform the burst transaction in verifying a memory coherency. Thus, the time required for verification can be remarkably reduced.

23 Claims, 4 Drawing Sheets

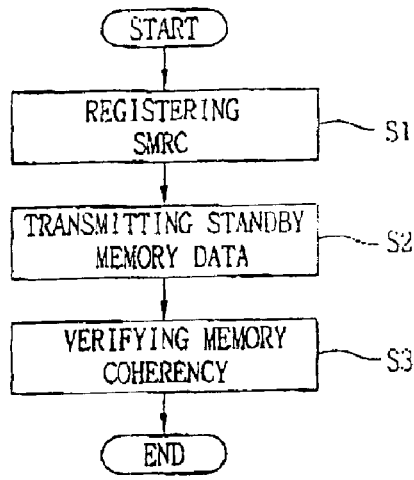
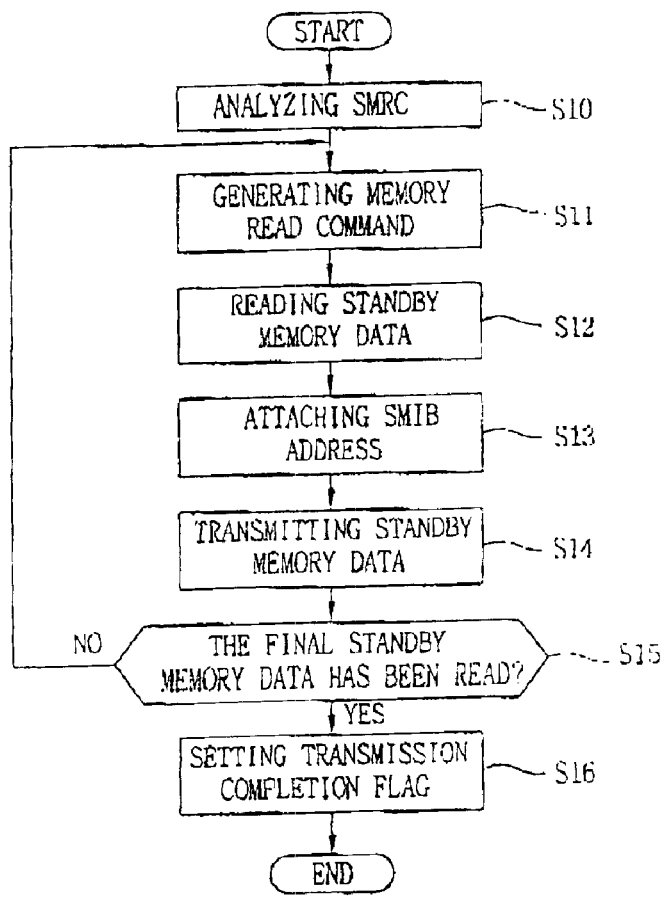

APPARATUS AND METHOD FOR VERIFYING MEMORY COHERENCY OF DUPLICATION PROCESSOR

BACKGROUND OF THE INVENTION

1. Field of the Invention

The present invention relates to a duplication processor of a switching system, and more particularly to an apparatus and a method for verifying memory coherency of a duplication processor.

2. Description of the Background Art

Generally, a processor of a switching system has a duplication structure of two processors, having the same construction to each other, that is, an active processor which is operated in an active mode and a standby processor which is operated in a standby mode FIG. 1 is a schematic block diagram of-a duplication processor including an active processor 10 and a standby processor 20.

As shown in the drawing, the active processor 10 includes a first CPU 11, a first memory controller 12, a local bus controller 13 and a first duplication pathway 14.

The first CPU 11 performs a general controlling operation of the processor, and for verifying memory coherency, it starts a standby memory read transaction (SMRT) and informs the local bus controller 13 of it.

The first memory controller 12 arbitrates a processor bus (P-bus) according to a transaction request by the local bus controller 13.

The local bus controller 13 requests the bus arbitration (BA) from the first memory controller 12 according to the transaction of the CPU 11, and at the same time, outputs a standby memory read address outputted from the CPU 11 to the first duplication pathway 14.

The first duplication pathway 14 provides a path for the read address of the standby memory 23 and the data read from the standby memory 23, and discriminates clock rates of the processor bus (P-bus), a duplication bus (D-bus) and a duplication channel (D-ch).

Having a structure symmetrical to that of the active processor 10, the standby processor 20 includes a second memory controller 22, a standby memory 23, a processor bus controller 24 and a second duplication pathway 25.

The second memory controller 22 arbitrates bus use of the processor bus controller 24 and reads the standby memory 23 according to a request of memory reading by the processor bus controller 24.

The second duplication pathway 25 performs the same operation as that of the first duplication pathway 14.

The operation of the duplication processor constructed as described will now be described.

When the first CPU 11 starts a standby memory read transaction (SMRT), the local bus controller 13 requests a bus arbitration (BA) from the first memory controller 12. When a bus use right is given from the first memory controller 12, the local bus controller 13 outputs a read address (RA) of the standby memory 23 outputted from the first CPU 11 to the first duplication pathway 14. Then, the first duplication pathway 14 transmits the inputted address (RA) through the duplication channel (D-ch) to the standby processor 20.

Thereafter, when the address (RA) is inputted through the second duplication pathway 25 from the active processor 10, the processor bus controller 24 requests bus arbitration from the second memory controller 22. And, when the bus use is allowed by the second memory controller 22, the processor bus controller 24 outputs the read address (RA) to the second memory controller 22.

Consequently, the second memory controller 22 reads a data corresponding to the read address (RA) from the standby memory 23 under the control of the processor bus controller 24 and outputs the data to the processor bus controller 24, and then, the processor bus controller 24 transmits the read data of the standby memory 23 through the second duplication pathway 25 to the active processor 10.

Accordingly, the local bus controller 13 transmits the read data of the standby memory 23 which has been received from the standby processor 20 through the first duplication pathway 14, to the CPU 11, thereby completing transaction.

Thereafter, the CPU 11 repeatedly performs the above described transaction operation to read all the data from the standby memory 23, and compares the data with a data stored in an active memory (not shown) to perform a coherency verifying operation of the memory.

In this manner, the conventional duplication processor has an advantage in that the clock rates of the processor bus (P-bus), the duplication bus (D-bus) and the duplication channel (D-ch) can be discriminated by virtue of the duplication pathway existing in both processors.

However, the conventional duplication processor structure employs a hand-shake method to perform the transaction operation. Thus, even though the active processor starts reading operation of the standby memory, a long time is taken for transaction according to an operation state of the D-ch and the standby processor. As a result, the CPU of the active processor should wait to proceed to other operation until the transaction operation is completely performed.

In addition, in the conventional duplication processor structure, each transaction is performed by a single beat, resulting in that a long time is to be taken to perform coherency verifying for all the standby memories,

SUMMARY OF THE INVENTION

Therefore, an object of the present invention is to provide an apparatus and method for verifying memory coherency of duplication processor which is capable of improving a use efficiency of a CPU by reducing a load at an active processor generated when a standby memory is read.

Another object of the present invention is to provide an apparatus and method for verifying memory coherency of duplication processor which is capable of reducing the time of coherency verification by providing an active processor with a cacheability of a standby memory image.

To achieve these and other advantages and in accordance with the purpose of the present invention, as embodied and broadly described herein, there is provided an apparatus for verifying memory coherency of a duplication processor having a symmetrical structure including: an active processor in which a standby memory read command (SMRC) is generated and transmitted by hardware and then a read data of the standby memory which has been inputted corresponding to the SMRC is image-buffered to verify a memory coherency; and a standby processor in which the SMRC transmitted from the active processor is analyzed and a read command of a standby memory is outputted, and then the data read from the standby memory is transmitted to the active processor.

In order to achieve the above objects, the active processor of the apparatus for verifying memory coherency of a duplication processor includes: a standby memory image buffer (SMIB) for temporarily storing a read data of a standby memory; a CPU for generating an SMRC; a first memory controller for storing the read data of the standby memory in the SMIB; a first processor bus controller for applying the read data of the standby memory to the first memory controller; and a first duplication processor for informing the standby processor of a registered SMRC when the SMRC is registered by the CPU, and outputting a command done signal to the CPU when the reading operation of the standby memory is completed.

In order to achieve the above objects, the standby processor of the apparatus for verifying memory coherency of a duplication processor includes a second memory controller for controlling access of the standby memory; a second processor bus controller for transmitting a received SMRC to the second memory controller, and a second duplication processor for analyzing the SMRC inputted through the second memory controller, sequentially generating a read address of the standby memory, and transmitting the data read from the standby memory to the active processor.

In the present invention, the SMRC includes a start address of the standby memory, a size of a data to be read and an address of the SMRC to store the read data.

In order to achieve the above objects, there is also provided a method for verifying memory coherency of a duplication processor including the steps of registering a standby memory read command (SMRC); transmitting the registered SMRC to the standby processor; analyzing the transmitted SMRC reading the data of the standby memory and transmitting the read data to the active processor storing the read data as transmitted in the standby memory image buffer (SMIB); and verifying memory coherency by comparing the stored data of the SMIB and the correspondence data of the active memory.

The step of transmitting a read data in the method for verifying memory coherency of a duplication processor of the present invention includes the sub-steps of: analyzing the transmitted SMRC and sequentially generating a read address of the standby memory; reading the data from the standby memory according to the generated address; and checking whether the data has been read as much as requested and setting a transmission completion flag on the final read data.

The step of storing a read data in the method for verifying memory coherency of a duplication processor of the present invention includes the sub-steps checking whether a transmission completion flag of the read memory has been set; storing a corresponding data in the SMIB according to the SMIB address in case that a transmission completion flag has not been set; generating a write done signal in case that a transmission completion flag of the read memory has been set; and generating a command done signal when the write done signal is generated, and informing of completion of the operation of the SMRC.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flow chart of a method for verifying memory coherency of the duplication processor in accordance with the present invention;

FIG. 4 is a flow chart of an operation of a standby processor of FIG. 3 in accordance with the present invention.

DETAILED DESCRIPTION OF THE PREFERRED EMBODIMENTS

Reference will now be made in detail to the preferred embodiments of the present invention, examples of which are illustrated in the accompanying drawings.

The present invention is featured in that a reading operation of a standby memory, which has been performed by software in the conventional art, is performed by hardware, and a burst mechanism is provided for an image of the standby memory. That is, a CPU of an active processor of the present invention registers only a standby memory read command (SMRC) in the duplication processor, and performs a different operation until the memory reading operation is completed.

In addition, the present invention is also featured in that a standby memory image buffer (SMIB) different to an actual standby memory is implemented in a predetermined region of an active memory, so that a burst transaction can be performed in verifying memory coherency through the reading operation of the standby memory.

Figure 2:
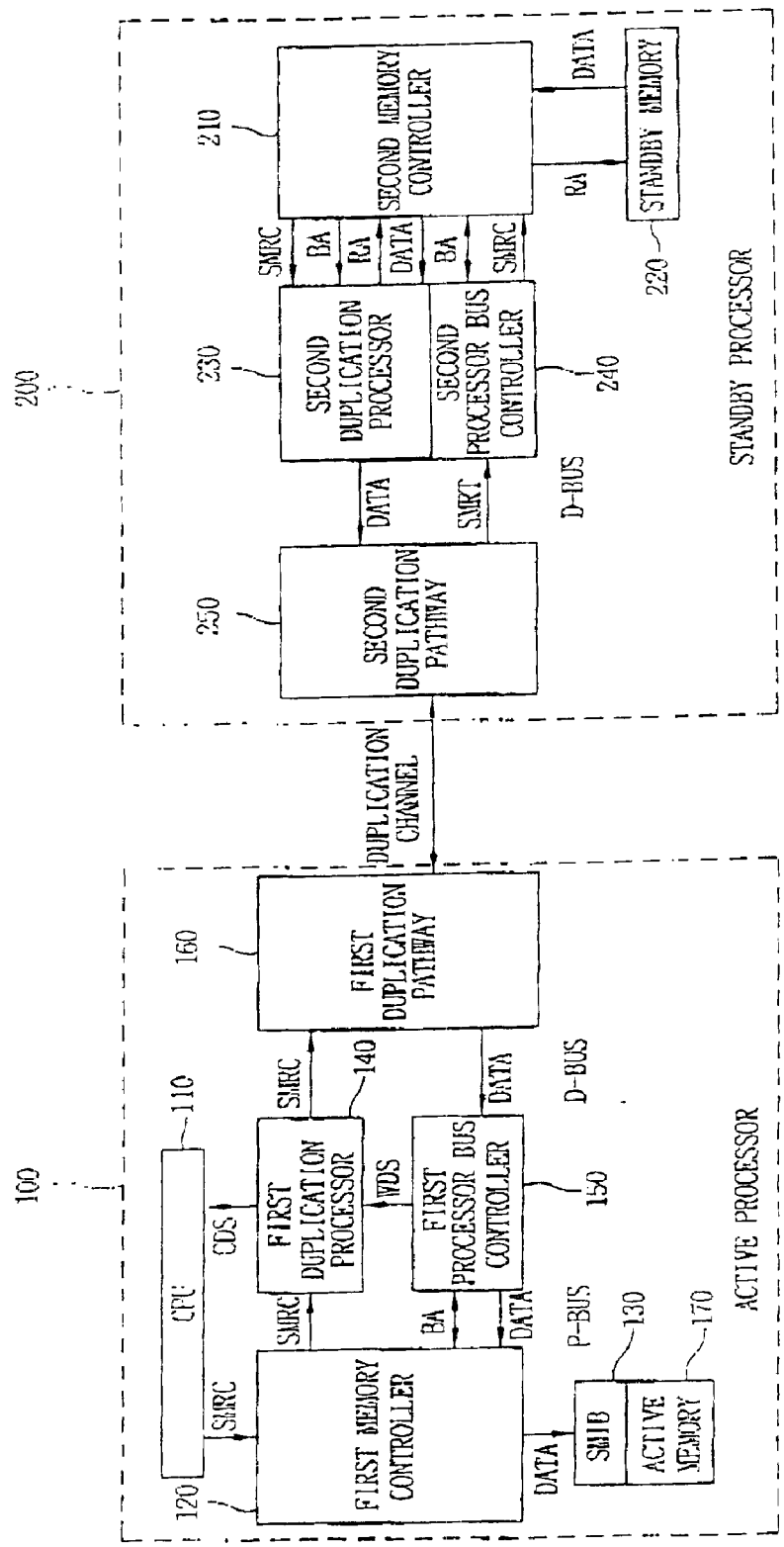
FIG. 2 is a schematic block diagram showing a construction of a duplication processor in accordance with the present invention.
Figure 5:
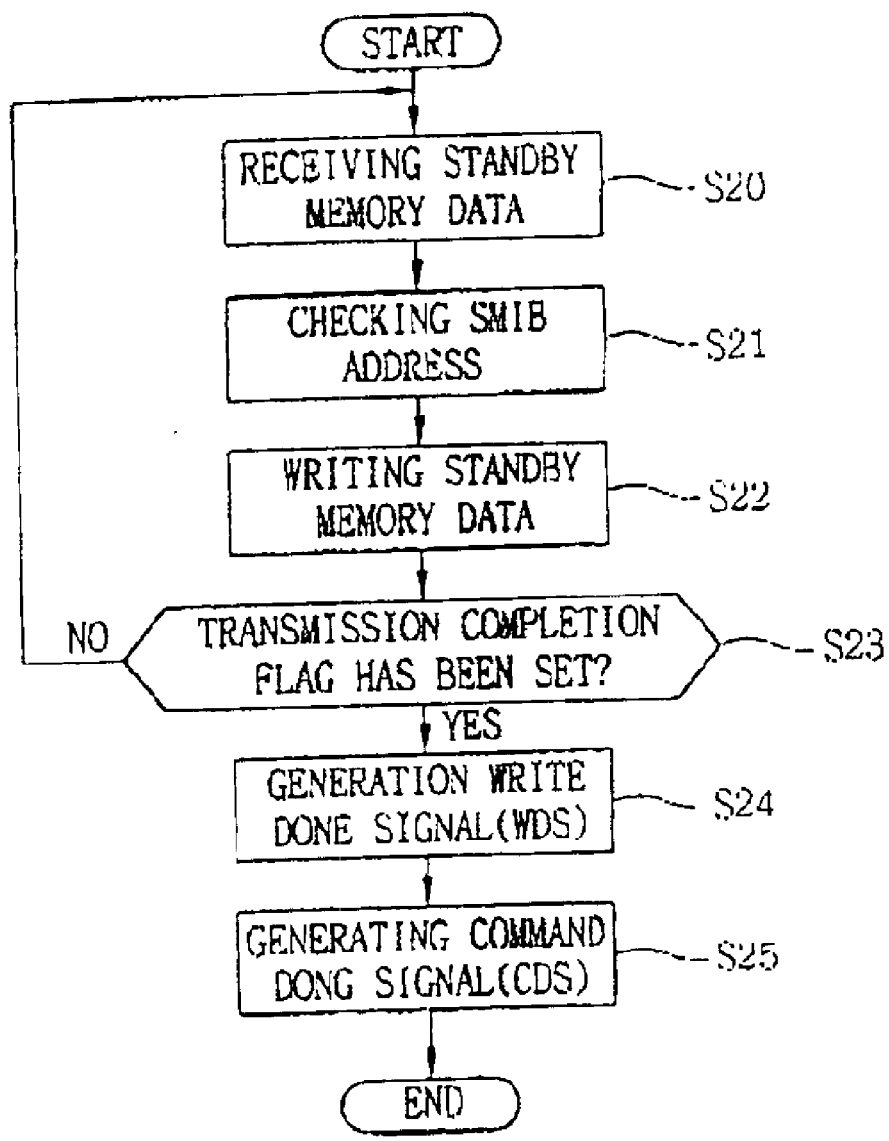
FIG. 5 is a flow chart of an operation of a standby processor of FIG. 3 in accordance with the present invention.

FIG. 2 is a schematic block diagram showing a construction of a duplication processor in accordance with the present invention.

Figure 1:
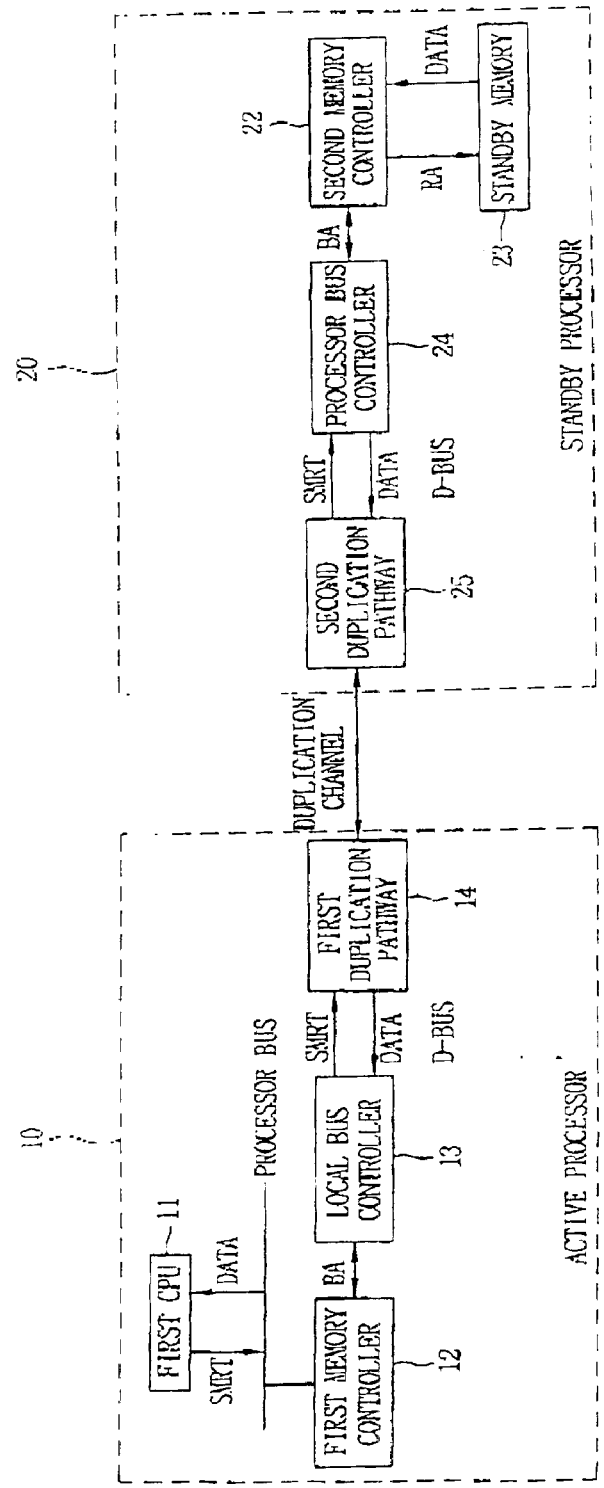
FIG. 1 is a schematic block diagram showing a construction of a duplication processor in accordance with a conventional art.

As shown in the drawing, the duplication processor of the present invention additionally includes a first and a second duplication processor 140 and 230, and a standby memory image buffer (SMIB) 130 into the construction of the conventional art as shown in FIG. 1.

A CPU 110 of an active processor 100 controls the overall system, and generates a standby memory read command (SMRC) in verifying coherency for the standby memory. At this time, the SMRC includes a start address of a standby memory 220, the data size and an address indicating an SMIB in which a read data is to be stored.

A first memory controller 120 gives a bus use right to a first processor bus controller 150 and stores a read data of the standby memory 220 in the SMIB 130.

The SMIB (Standby Memory Image Buffer) 130 is a block for temporarily storing the read data of the standby memory 220. The present invention includes two SMIBs 130, of which one SMIB is used to verify coherency, the other is used to store the read data of the standby memory 220. Each SMIB is discriminated by 1 bit SMIB address included in the SMRC.

A first duplication processor 140 transmits the SMRC outputted from the CPU 110 to the standby processor, and outputs a command done signal (CDS) to the CPU 110 according to a write done signal (WDS) outputted from the first processor bus controller 150.

The first processor bus controller 150 transmits the read data of the standby memory 220 to the first memory controller 120, and when the final read data is received, the first processor bus controller 150 outputs a write done signal (WDS) to the first duplication processor 140.

The first duplication pathway 160 and the active memory 170 are performed the same manner as in the conventional art, descriptions of which are thus omitted.

A second memory controller 210 of a standby processor 200 gives a bus use right to a second processor bus controller 240, and transmits the SMRC transmitted from the active processor 100 to a second duplication processor 230.

A second memory controller 210 accesses to the standby memory 220 according to a read address (RA) outputted from the second duplication processor 230.

The second duplication processor 230 sequentially generates the read address (RA) of the standby memory 220 according to the start address and the data size included in the SMRC, and attaches an SMIB address to each read data of the standby memory 220.

A standby memory 220, a second processor bus controller 240 and a second duplication pathway 250 of the present invention are the same as that of the conventional art, so that descriptions therefor are omitted.

The operation of the duplication processor constructed as described above will now be explained.

FIG. 3 is a flow chart of a method for verifying memory coherency of the duplication processor in accordance with the present invention.

As shown in the drawing, in the present invention, the SMRC registering process (S1), the SMRC processing process (S2) and the coherency verifying process (S3) are sequentially performed.

1) SMRC Registering:

First, the CPU 110 of the active processor 100 generates an SMRC including a start address, the size of a data to be read and an SMIB address for writing a read data, and outputs the SMRC to the first duplication processor 140, thereby registering the SMRC (S1) After the SMRC is registered, the SMRC is processed by the first duplication processor 140, so that the CPU 110 can perform other operation while the reading operation of the standby memory 220 is performed 2) SMRC Processing The first duplication processor 140 of the active processor 100 outputs the inputted SMRC through the first duplication pathway 160 to the standby processor 200 Then, the second duplication processor 230 of the standby processor 200 receives the SMRC through the second duplication pathway 250, the second processor bus controller 240 and the second memory controller 210, and generates a read address (RA) of the standby memory 220 on the basis of information included in the SMRC.

In detail, the second duplication processor 230 analyzes the SMRC (S10) and sequentially generates read addresses (RA) of the standby memory 220 on the basis of the start address and the size of the data included in the SMRC. For example, assuming that a start address is 'A' and the size of the data is '4', the second duplication processor 230 sequentially generates read addresses from 'A' to 'D' (S11). Then, the second memory controller 210 reads data corresponding to the read addresses (RA) from the standby memory 220 and outputs them to the second duplication processor 230 (S12).

Whenever the second duplication processor 230 receives the read data of the standby memory 220 from the second memory controller 210, the second duplication processor 230 attaches an SMIB address to each read data and transmits it through the second duplication pathway 250 to the active processor 100 (S13, S14). And, at this time, the second duplication processor 230 confirms whether the data has been all read as much as the size set in the SMRC (S15), and if the data as much as the set size is all read, the second duplication processor 230 sets a transmission completion flag to the final read data and transmits it through the first duplication pathway 250 to the active processor 100 (S16).

When the read data of the standby memory 220 is received through the first duplication pathway 160 (S20), the first processor controller 150 checks the SMIB address attached to each read data and stores the corresponding read data in the SMIB 130 (S21, S22). And, at this time, the first processor controller 150 checks a transmission completion flag of each read data (S23), and if the transmission completion flag has been set, the first processor controller 150 stores the final read data in the SMIB 130 and outputs the write done signal (WDS) to the first duplication processor 140 (S24).

Then, the first duplication processor 140 generates a command done signal (CDS) according to the write done signal (WDS) outputted from the first processor bus controller 150 and outputs it to the CPU 110 (S25), thereby informing that the data of the standby memory 220 desired by the CPU 110 has been completely stored in the SMIB 130.

3) Coherency Verification

When the CPU 110 receives the command done signal (CDS) from the first duplication processor 140, it compares the data stored in SMIB 130 and the data stored in the active memory 170 to perform a memory coherency verifying operation.

As so far described, according to the apparatus and method for verifying memory coherency of a duplication processor of the present invention, the CPU of the active processor outputs only the SMRC command and the SMRC is separately processed by the duplication processor. Thus, the load of the CPU is reduced, and accordingly, the use efficiency of the CPU can be increased.

In addition, the burst transaction can be performed both when the data is read from the standby memory and when the read data is transmitted, so that the use efficiency of the processor bus, the duplication bus and the duplication channel can be improved. Especially, a bad influence according to the operation of each processor and the duplication channel can be minimized.

Moreover, the SMIB provides burst mechanism function, so that the CPU of the active processor can perform the burst transaction in verifying a memory coherency Thus, the time required for verification can be remarkably reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for verifying a memory coherency of a duplication processor having a symmetrical structure comprising:
   an active processor in which a standby memory read command (SMRC) is generated and transmitted by hardware and then a read data of a standby memory which has been inputted corresponding to the SMRC is image-buffered to verify a memory coherency; and
   a standby processor in which the SMRC transmitted from the active processor is analyzed and a read command of a standby memory is outputted, and then data read from the standby memory is transmitted to the active processor,
   wherein the active processor comprises:
   a standby memory image buffer (SMIB) for temporarily storing a read data of the standby memory;
   a CPU for generating the SMRC;
   a first memory controller for storing the read data of the standby memory in the SMIB;
   a first processor bus controller for applying the read data of the standby memory to the first memory controller; and
   a first duplication processor for informing the standby processor of a registered SMRC when the SMRC is registered by the CPU, and outputting a command done signal to the CPU when the reading operation of the standby memory is completed.

2. The apparatus according to claim 1, wherein the SMRC includes a start address, a size of a data to be read and an address of the SMIB for storing a read data.

3. The apparatus according to claim 1, wherein the SMIB is provided in a predetermined region of an active memory of the active processor.

4. The apparatus according to claim 1, wherein the first processor bus controller checks a transmission completion flag of each read data, and when the transmission completion flag has been set, the first processor bus controller outputs a write done signal to the first duplication processor.

5. The apparatus according to claim 1, wherein the first duplication processor generates the command done signal when it receives a write done signal from the first processor bus controller.

6. The apparatus according to claim 1, wherein when the CPU receives the command done signal from the first duplication processor, it compares the data of an active memory of the active processor and the data of the SMIB to verify the memory coherency.

7. The apparatus according to claim 1, wherein the standby processor comprises:
   a second memory controller for controlling access of the standby memory;
   a second processor bus controller for transmitting a received SMRC to the second memory controller, and
   a second duplication processor for analyzing the SMRC inputted through the second memory controller, sequentially generating a read address of the standby memory, and transmitting the data read from the standby memory to the active processor.

8. The apparatus according to claim 7, wherein the second duplication processor attaches an address of the SMIB included in the active processor to each read data.

9. The apparatus according to claim 7, wherein when the second duplication processor receives the final read data from the second memory controller, it sets a transmission completion flag of the corresponding read data.

10. A method for verifying a memory coherency of a duplication processor comprising:
    registering a standby memory read command (SMRC);
    transmitting the registered SMRC to a standby processor;
    analyzing the transmitted SMRC, reading data of a standby memory and transmitting the read data to an active processor;
    storing the read data as transmitted in a standby memory image buffer (SMIB); and
    comparing the stored data of the SMIB and a stored data of an active memory and verifying memory coherency,
    wherein transmitting the read data comprises:
    analyzing the transmitted SMIRC and sequentially generating a read address of the standby memory;
    reading the data from the standby memory according to the generated address and
    checking whether the data has been read as much as requested and setting a transmission completion flag on the final read data.

11. The method according to claim 10, wherein the SMIB is provided in a predetermined region of the active memory.

12. The method according to claim 10, wherein the SMRC includes a start address, a size of a data to be read and an address of the SMIB for storing a read data.

13. The method according to claim 10, wherein storing the read data comprises:
    checking whether a transmission completion flag of the read memory has been set; and
    storing a corresponding data in the SMIB according to a SMIB address when the transmission completion flag has not been set.

14. The method according to claim 13, further comprising:
    generating a write done signal when the transmission completion flag of the read memory has been set; and
    generating a command done signal when the write done signal is generated, and informing completion of the operation of the SMRC.

15. An apparatus for verifying a memory coherence of a duplication processor, comprising:
    an active processor including an active memory, a standby image memory buffer (SMIB) and first and second processors, said first processor configured to issue a standby memory read command to the second processor; and
    a standby processor including a standby memory,
    wherein upon receiving the standby memory read command from the first processor, the second processor instructs the standby processor to read data from the standby memory and controls operations to store the data read from the standby memory into the SMIB such that the first processor need only issue the standby memory read command to have data from the standby memory stored into the SMIB.

16. The apparatus according to claim 15, wherein the first processor comprises a Central Processing Unit (CPU).

17. The apparatus according to claim 15, wherein the SMIB is included in the active memory.

18. The apparatus according to claim 15, wherein the second processor issues a command done signal to the first processor when the data from the standby memory has been stored in the SMIB.

19. A method for verifying a memory coherence of a duplication processor including first and second active processors and a standby processor, comprising:

issuing a standby memory read command from the first active processor to the second active processor;

issuing the standby memory read command from the second active processor to the standby processor;

reading data from a standby memory upon receiving the standby memory read command from the second active processor; and storing the data read from the standby memory into a standby memory image buffer (SMIB), wherein the second active processor instructs the standby processor to read data from the standby memory and controls operations to store the data read from the standby memory into the SMIB such that the first active processor need only issue the standby memory read command to have data from the standby memory stored into the SMIB.

20. The method according to claim 19, further comprising:

comparing the data stored in the SMIB with similar data stored in an active memory to verify whether or not the data are the same and verify the memory coherence of a duplication processor.

21. The method according to claim 19, wherein the first active processor comprises a Central Processing Unit (CPU).

22. The method according to claim 19, wherein the SMIB is included in the active memory.

23. The method according to claim 19, further comprising:

issuing a command done signal from the second active processor to the first active processor when the data from the standby memory has been stored in the SMIB.

* * * * *